(12) United States Patent
Martin et al.

(10) Patent No.: US 12,095,207 B2
(45) Date of Patent: Sep. 17, 2024

(54) MECHANICAL AND ELECTRICAL CONNECTION OF ELECTRIC MACHINES AND ELECTRICAL COMPONENTS IN AN ELECTRICAL SYSTEM USING QUICK CONNECT/DISCONNECT CONNECTORS

(71) Applicant: GENERAL ELECTRIC COMPANY, Schenectady, NY (US)

(72) Inventors: Matthew Robert Martin, Schenectady, NY (US); John Russell Yagielski, Scotia, NY (US); Philip Michael Cioffi, Schaghticoke, NY (US); Mark Edward Dame, Niskayuna, NY (US); Wei Zhang, Clifton Park, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 85 days.

(21) Appl. No.: 17/967,976

(22) Filed: Oct. 18, 2022

(65) Prior Publication Data
US 2024/0128695 A1    Apr. 18, 2024

(51) Int. Cl.
*H01R 13/05* (2006.01)
*H01B 7/42* (2006.01)
(Continued)

(52) U.S. Cl.
CPC ............. *H01R 24/28* (2013.01); *H01B 7/423* (2013.01); *H01R 13/005* (2013.01); *H01R 13/05* (2013.01);
(Continued)

(58) Field of Classification Search
CPC ...... H01B 7/423; H01R 13/005; H01R 13/05; H01R 13/11; H01R 13/15; H01R 13/17;
(Continued)

(56) References Cited

U.S. PATENT DOCUMENTS

| 3,387,155 A | 6/1968 | Krulls |
| 3,710,478 A | 1/1973 | Krulls et al. |

(Continued)

FOREIGN PATENT DOCUMENTS

| CN | 111564739 | 8/2010 |
| CN | 212304032 | 1/2015 |

(Continued)

OTHER PUBLICATIONS

International Search Report and Written Opinion dated Feb. 2, 2024 for corresponding Application No. PCT/US2023/076692.
(Continued)

*Primary Examiner* — Levi Gannon
(74) *Attorney, Agent, or Firm* — Grogan, Tuccillo & Vanderleeden LLP (57) ABSTRACT

An approach for facilitating mechanical and electrical connection of electric machines and electrical components in an electrical system using connectors with quick connect/disconnect electrical connectors is disclosed. Each quick connect/disconnect electrical connector can be placed on the end of an electrical power distribution cable that connects with an electric machine or electrical component. The electric machines and electrical components and the electrical power distribution cables can have hollow coolant passages formed therein to receive cooling fluid from a cooling device for direct cooling of the electric machines, electrical components and the electrical power distribution cables.

20 Claims, 6 Drawing Sheets

(51) Int. Cl.
*H01R 13/00* (2006.01)
*H01R 13/11* (2006.01)
*H01R 13/52* (2006.01)
*H01R 13/627* (2006.01)
*H01R 24/20* (2011.01)
*H01R 24/28* (2011.01)
*H01R 24/66* (2011.01)
*H01R 24/76* (2011.01)
*H02J 3/38* (2006.01)
*H01R 101/00* (2006.01)

(52) U.S. Cl.
CPC ......... *H01R 13/11* (2013.01); *H01R 13/5219* (2013.01); *H01R 13/6278* (2013.01); *H01R 24/20* (2013.01); *H01R 24/66* (2013.01); *H01R 24/76* (2013.01); *H02J 3/381* (2013.01); *H01R 2101/00* (2013.01)

(58) Field of Classification Search
CPC .. H01R 13/18; H01R 13/187; H01R 13/5219; H01R 13/62; H01R 13/627; H01R 13/6278; H01R 24/20; H01R 24/28; H01R 24/66; H01R 24/76; H01R 2101/00; H02J 3/381
See application file for complete search history.

(56) References Cited

U.S. PATENT DOCUMENTS

| | | | |
|---|---|---|---|
| 3,864,803 A | | 2/1975 | Ohmstedt et al. |
| 5,735,716 A | * | 4/1998 | Bilezikjian .......... H01R 13/187 |
| | | | 439/843 |
| 5,795,170 A | * | 8/1998 | Okabe ................ H01R 13/5216 |
| | | | 439/252 |
| 5,904,599 A | * | 5/1999 | Miller .................... H01R 13/17 |
| | | | 439/825 |
| 5,938,465 A | * | 8/1999 | Fox, Sr. ............... H01R 13/627 |
| | | | 439/578 |
| 7,218,028 B2 | | 5/2007 | Annis et al. |
| 9,337,597 B2 | | 5/2016 | Daamen et al. |
| 9,537,241 B2 | | 1/2017 | Rivera et al. |
| 9,647,404 B2 | | 5/2017 | Steinbach et al. |
| 9,793,670 B2 | | 10/2017 | Steinbach et al. |
| 10,096,814 B2 | | 10/2018 | Naito |
| 10,581,196 B2 | | 3/2020 | Liu et al. |
| 11,177,599 B2 | | 11/2021 | Horning et al. |
| 2010/0003866 A1 | * | 1/2010 | Dent .................... H01R 13/187 |
| | | | 439/843 |
| 2010/0015834 A1 | | 1/2010 | Siebens |
| 2010/0321003 A1 | | 12/2010 | Geiger et al. |
| 2011/0065337 A1 | | 3/2011 | Cheng |
| 2012/0043837 A1 | * | 2/2012 | Le Besnerais ........... H02K 9/04 |
| | | | 310/64 |
| 2013/0225012 A1 | | 8/2013 | Leng et al. |
| 2014/0106587 A1 | * | 4/2014 | Verhagen ............. H01R 13/005 |
| | | | 439/196 |
| 2015/0187465 A1 | * | 7/2015 | McErlean ............. H01R 43/00 |
| | | | 29/857 |
| 2015/0243411 A1 | | 8/2015 | Maeda |
| 2016/0093959 A1 | | 3/2016 | Feye-Hohmann et al. |
| 2020/0234853 A1 | * | 7/2020 | Lee ........................ H01B 7/423 |
| 2021/0091518 A1 | * | 3/2021 | Baldus-Kunze ... H01R 13/6271 |
| 2021/0399454 A1 | | 12/2021 | Liu et al. |

FOREIGN PATENT DOCUMENTS

| | | |
|---|---|---|
| CN | 208753575 | 4/2019 |
| CN | 110224251 | 9/2019 |
| CN | 210576893 | 5/2020 |
| DE | 1926776 | 11/1965 |
| DE | 1944370 | 8/1966 |
| DE | 102013202029 | 8/2014 |
| DE | 102015214327 | 9/2016 |
| EP | 1622226 | 2/2006 |
| JP | 620249262 | 3/1987 |

OTHER PUBLICATIONS

"The Multilam Principle", Advanced Contact Technogoly, Multi-Contact Staubli Group, Nov. 2011 https://www.heliant.it/images/FV/MC4_multilam.pdf.

* cited by examiner

MECHANICAL AND ELECTRICAL CONNECTION OF ELECTRIC MACHINES AND ELECTRICAL COMPONENTS IN AN ELECTRICAL SYSTEM USING QUICK CONNECT/DISCONNECT CONNECTORS

BACKGROUND

Technical Field

Embodiments of this disclosure relate generally to electrical systems, and more specifically, to implementing mechanical and electrical connections of electric machines and ancillary electrical components in an electrical system that involves electrical power generation and electrical power distribution using quick connect/disconnect connectors.

DISCUSSION OF ART

An aircraft electrical system is one example in which electric machines and ancillary electrical components can be implemented in an electrical system for purposes of power generation and power distribution. Typically, the electric machines and the ancillary electrical components in an aircraft electrical system are connected using bus bar connectors that involve the use of a mechanical fixation device for fixation of at least one terminal from the machines and components in a secure position on the bus bar. In this manner, electrical power that is generated can be distributed among the electric machines and the ancillary electrical components via the bus bar connectors. The use of these bus bar connectors in such aircraft electrical systems is less desirable as more powerful and integrated electric machines and electrical components are being employed on aircraft. For example, the bus bar connectors can become loose in a vibratory environment, especially at the connections of the electric machines and the electrical components. In addition, the electric machines and the electrical components can become misaligned under environmental loads. Given the advent of more powerful and integrated electric machines being employed on aircraft, the ability to make very dependable and secure electrical connections between components and/or internally to sub-components of a given assembly becomes paramount.

Another reason that the use of bus bar connectors is becoming less desirable is because many of the electric machines and the ancillary electrical components are implemented in an aircraft electrical system as line replaceable units (LRU). In general, LRUs are module components in an aircraft that can be replaced quickly, and typically with a minimum of tools. To this extent, LRUs can facilitate maintenance in-situ in an expeditious manner rather than in a designated maintenance facility. Since bus bar connectors typically involve bolted connections, their use in LRUs of an aircraft electrical system is not ideal as there will be many bolted connections that will have to be dismantled and reassembled. The dismantling and reassembling of the bolted connections is at odds with the notion that LRUs should be replaced quickly, with a minimum of tools. This lack of compatibility with LRUs makes the use of bus bar connectors less than ideal from a manufacture and producibility point of view in future aircraft electrical systems, especially as more complex and powerful the systems will become in subsequent aircraft.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

Instead of using bus bar connectors or other commonly used connectors that can be used in electrical systems that involve electrical power generation and electrical power distribution such as standard pin style connectors, crimped connectors, brazed connectors, and mechanical connectors, the various embodiments of the present invention utilize quick connect/disconnect connectors to implement mechanical and electrical connections of electric machines and ancillary electrical components in an electrical system. The electric machines and the ancillary electrical components can include, but are not limited to, low/medium/high voltage electric generators, motors, inverters, energy storage devices, instrumentation and power transmission hardware.

The application of quick connect/disconnect connectors in an electrical system allows for a "plug-in" style assembly and disassembly of the electric machines and the ancillary electrical components due to their quick connect style interface. The quick connect/disconnect connectors can include, but are not limited to, spring-based electrical connectors, push-pull electrical connectors, and in-line voltage electrical connectors using male and female connectors.

In one embodiment, the quick connect/disconnect connectors can include spring-based electrical connectors. A spring louvered electrical connector with one or more louvered springs is an example of a spring-based electrical connector that is suitable for use as a quick connect/disconnect connector to facilitate mechanical and electrical connection of electric machines, electrical components and power distribution cables in an electrical system for embodiments described herein. In one embodiment, one or more of the louvered springs can be implemented on the male part (e.g., a plug) or the female part (e.g., a receptacle, socket) of the connectors. The louvered springs offer a reduced insertion force to facilitate the connection between the electric machines, electrical components, and cables, and provide a constant pressure in a mated condition. In this manner, the louvered springs can act as both a path for electric current, as well as a mechanical engagement between the male and the female halves of the connector assembly that is formed between the electric machines/electrical components and electrical power distribution cables connected thereto via the connectors. Since the louvered springs in these spring-based electrical connectors provide an active engagement force maintaining the mechanical and electrical contact between the electric machines/electrical components and the electrical power distribution cables, no separate means of mechanical joining is required (i.e., mechanical fixation devices).

The quick connect style interface of the quick connect/disconnect connectors such as the spring louvered electrical connectors make these connectors suitable for use in aircraft electrical systems that integrate power dense electric machines and electrical components. For example, the various embodiments of the present invention are directed to electrical systems for high voltage, high power applications. These high voltage, high power applications can include, but are not limited to, aircraft (e.g., part of an aircraft propulsion and/or power generation system), and power generation (e.g., high voltage direct current interconnections associated with the electric grid, solar and wind turbine implementations).

In one embodiment, the connector assembly that is formed between the electric machines/electrical components and the electrical power distribution cables connected thereto via the quick connect/disconnect connectors such as spring-based electrical connectors (e.g., spring louvered connectors) can include hollow conductor coolant passages formed therein to receive cooling fluid from a cooling device. In this manner, the cooling fluid can be supplied to the electric machines/electrical components and the electrical power distribution cables for direct cooling of the machines/components as well as the cables. In one embodiment, in which the electric machines include a stator and stator windings (e.g., an electric motor, an electric generator), the cooling fluid from the cooling device can be used to directly cool the stator windings, as well as the phase leads emanating from the electric machines, and the electrical power distribution cables and the quick connect/disconnect connectors connecting to the machines. In one embodiment, in which the high voltage, high power electrical systems utilize ancillary electrical components such as for example, inverters, instrumentation and power transmission hardware, and energy storage devices, the cooling fluid from the cooling device can be used to directly cool these components as well.

In accordance with one embodiment, a system is provided. The system comprises: a plurality of electric machines and electrical components, each electric machine and electrical component having a lead end; a plurality of electrical power distribution cables to distribute power between the plurality of electric machines and electrical components; a plurality of connectors to facilitate mechanical and electrical connections of the plurality of electric machines and electrical components with the plurality of electrical power distribution cables, each connector placed between one of the electric machines and the electrical components and a corresponding electrical power distribution cable operative to provide power thereto, wherein each connector includes: a connector head that extends over a portion of the corresponding electrical power distribution cable that facilitates the mechanical connection between the one of the electric machines and electrical components and the corresponding electrical power distribution cable; a receptacle disposed in one of the lead end of the electric machines and electrical components and the corresponding electrical power distribution cable; a plug disposed in the other of the lead end of the electric machines and the electrical components and the corresponding electrical power distribution cable; and a quick connect/disconnect electrical connector disposed in one of the receptacle and the plug, the quick connect/disconnect electrical connector facilitating the electrical connection between the one of the electric machines and the electrical components and the corresponding electric power distribution cable.

In accordance with another embodiment, a system is provided. The system comprises: a plurality of electric machines and electrical components, each electric machine and electrical component having a lead end with a main phase lead thereat, the main phase lead having an interior cavity defining a hollow coolant passage formed therethrough; a plurality of electrical power distribution cables to distribute power between the plurality of electric machines and electrical components, each electrical power distribution cable including a hollow coolant passage therethrough; a plurality of connectors to facilitate mechanical and electrical connections between the plurality of electric machines and the electrical components with the plurality of electrical power distribution cables, each connector placed between one of the electric machines and the electrical components and a corresponding electrical power distribution cable operative to provide power thereto, wherein each connector includes: a connector head that extends over a portion of a corresponding electrical power distribution cable that facilitates the mechanical connection between the one of the electric machines and the electrical components and the corresponding electrical power distribution cable; a receptacle disposed in one of the main phase lead of the electric machines and the electrical components and the corresponding electrical power distribution cable; a plug disposed in the other of the main phase lead of the electric machines and the electrical components and the corresponding electrical power distribution cable; and a spring-based electrical connector disposed in one of the receptacle and the plug, the spring-based electrical connector facilitating the electrical connection between the one of the electric machines and the electrical components and the corresponding electrical power distribution cable, wherein the spring-based electrical connector includes protruding spring contacts; and a cooling device having cooling fluid operatively coupled to the plurality of electric machines and electrical components and the plurality of electrical power distribution cables, wherein the cooling device is configured to supply cooling fluid to the plurality of electric machines and electrical components via the hollow coolant passage in each of the electric machines and the electrical components and the plurality of electrical power distribution cables via the hollow coolant passage in each of the electrical power distribution cables.

DRAWINGS

The present invention will be better understood from reading the following description of non-limiting embodiments, with reference to the attached drawings, wherein below.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to electrical systems, and more specifically, to implementing mechanical and electrical connections of electric machines and ancillary electrical components in an electrical system that involves electrical power generation and electrical power distribution using quick connect/disconnect connectors. As used herein, quick connect/disconnect connectors cover any connector that facilitates prompt connection and disconnection of leads and terminals from electric machines and ancillary electrical components with power distribution cables with reduced insertion and removal forces for enabling connection and disconnection, and without any mechanical fixation devices to make mechanical connections between any of the elements in an electrical system. Examples of quick connect/disconnect connectors can include, but are not limited to, spring-based electrical connectors (e.g., a spring louvered electrical connector, a leaf spring like electrical connector), push-pull electrical connectors, and in-line voltage electrical connectors using male and female connectors.

Although the various embodiments are described with respect to electrical systems that involves electrical power generation and electrical power distribution in the aerospace sector such as in the aircraft industry, the mechanical and electrical connections of the electric machines and ancillary electrical components that are attained with the use of the quick connect/disconnect connectors are suitable for any application involving low voltage, medium voltage, or high voltage. For aircraft and aerospace usage, a low voltage application means voltages less than 125V dc, a medium voltage application means voltages that range from 125V-400V dc, and a high voltage application means voltages greater than 400V dc. In one embodiment, the quick connect/disconnect connectors can be implemented in high power, high voltage applications in which power dense electric machines and electrical components are integrated in electrical systems. As used herein, high power means greater than 250 kW, and power dense, which is equivalent to gravimetric power density (i.e., Electrical Power (e.g., in kW) divided by the equipment weight (e.g., in kW), is 2 kW/kg or higher. An example of a high power, high voltage application with power dense electric machines is an aircraft system. In particular, an aircraft propulsion and/or power generation system for existing aircraft platforms including hybrid electric aircraft, as well as future aircraft platforms including electric aircraft and hydrogen aircraft are examples of high power, high voltage applications with power dense flightworthy electric machines and ancillary system components. Other implementations of the various embodiments can include high voltage power generation applications such as for example high voltage direct current interconnections associated with the electric grid, solar and wind turbines.

Figure 1:
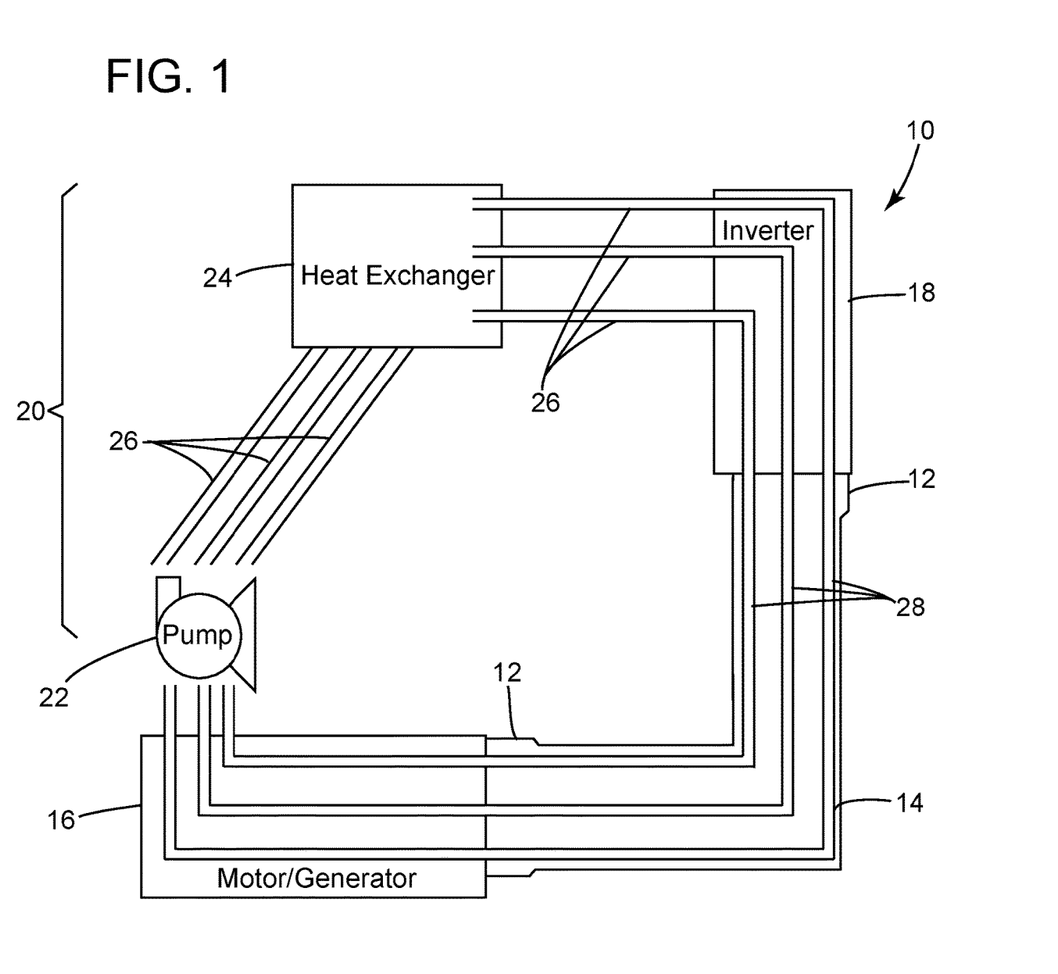
FIG. 1 shows a schematic of an electrical system utilizing connectors that include quick connect/disconnect connectors to implement electrical and mechanical connections between an electrical power distribution cable and an electric machine and an electrical component according to an embodiment of the invention.

Turning now to the figures, FIG. 1 shows a schematic of an electrical system 10 utilizing connectors 12 that can include the quick connect/disconnect connectors to implement electrical and mechanical connections between an electrical power distribution cable 14 and an electric machine 16 and an electrical component 18 according to an embodiment of the invention. In one embodiment, the electrical system 10 can be part of an aircraft electrical system used for electrical power generation and electrical power distribution in an aircraft. As shown in FIG. 1, the electric machine 16 can include a motor or a generator, and the electrical component 18 can include an inverter. For example, the motor/generator and the inverter can be of the three phase type with three leads that are electrically connected to the electrical power distribution cable 14 via the connectors 12. It is understood that the electric machine 16 depicted as a motor/generator and the electrical component 18 depicted as an inverter is only illustrative of an example of a possible electric machine and electrical component that can be used in the electrical system 10. Those skilled in the art will appreciate that the electrical system 10 for an aircraft can include different types of flightworthy electric machines and electrical components. Other electric machines and ancillary electrical components can include, but are not limited to, low/medium/high voltage energy storage devices, instrumentation and power transmission hardware. Further, the number of electric machines and electrical components, as well the connectors 12 depicted in FIG. 1 is for purposes of clarity and ease of describing embodiments of the present invention and is not meant to be limiting.

In one embodiment, as shown in FIG. 1, the electrical system 10 can include a cooling device 20 to supply a cooling fluid to the electrical power distribution cable 14, the electric machine 16, and the electrical component 18 for purposes of cooling these elements of the system 10 with the cooling fluid. In this example, the cooling device 20 can include a pump 22 that is configured to supply the cooling fluid to a heat exchanger 24 via piping 26. In operation, the pump 22 can recirculate cooling fluid used to directly cool the electric machine 16 (e.g., the stator windings of the stator of the motor/generator) by directing the cooling fluid received from the electric machine to the heat exchanger 24 via the piping 26. The heat exchanger 24 will dissipate heat from the cooling fluid received from the electric machine 16 via the pump 22 and the piping 26. The heat exchanger 24 can then direct the cooling fluid to the electrical component 18 via the piping 26 for cooling. The cooling fluid can then flow from the electrical component 18 to the electric machine 16 via the electrical power distribution cable 14.

In one embodiment, the electrical component 18, the electrical power distribution cable 14, and the electric machine 16 are in fluid communication via a shared coolant network 28. As used herein, the term "in fluid communication" means that there is a passage that allows a fluid to flow. The shared coolant network 28 of FIG. 1 can include hollow coolant passages that extend through the conductors of the electrical component 18, the electrical power distribution cable 14, and the electric machine 16. These coolant passages can be in fluid communication with the piping 26 that connects with the pump 22 and the heat exchanger 24. In one embodiment, as shown in FIG. 1, the coolant network 28 can include three coolant passages that extend through the conductors of the electrical component 18, the electrical power distribution cable 14, and the electric machine 16 that correspond to the leads of the conductors in the electric machine and the electrical component that receive power via the cable. To this extent, in the example in which the electric machine 16 includes a motor or a generator and the electrical component 18 includes an inverter, the cooling liquid can be used to cool these elements as well as the electrical power distribution cable 14. For example, with regard to the motor/generator, the cooling liquid can be used to cool the stator windings of the stator. Further details of the coolant passages are described below with regard to FIGS. 4-6.

The cooling fluid can include any of a number of known coolant media. For example, the cooling fluid can include coolant that is in the form of a gas or a liquid such as oil, de-ionized water, mineral oil, silicone oil, turbo oil, DI water, SF6, air, nitrogen, hydrogen, Argon. In one embodiment, the cooling fluid can include a super critical state liquid such as super critical $CO_2$.

The electrical system 10 of FIG. 1 is illustrative of only one possible system of implementing electrical and mechanical connections between the electrical power distribution cable 14, the electric machine 16 and the electrical component 18 using connectors 12 that can include the quick connect/disconnect connectors. An electrical system can be configured without the use of a cooling device that directly cools the electrical power distribution cables, the electric machines, and the electrical components. For example, FIGS. 2 and 3 show a connection between the electrical power distribution cable 14 and the connector 12, and a connection between the cable, the connector and the electric machine 16, respectively, without any coolant passages.

Figure 2:
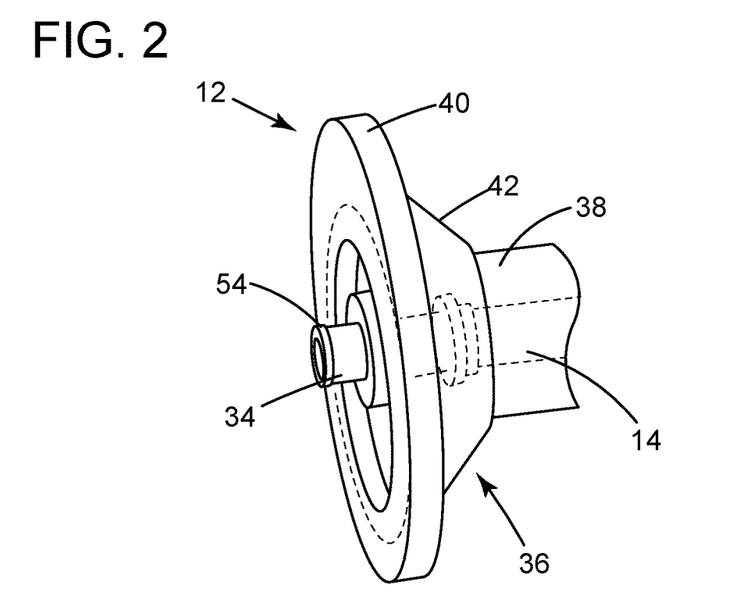
FIG. 2 shows a more detailed view of a quick connect/disconnect connector in connection with an electrical power distribution cable according to an embodiment of the invention.
Figure 3:
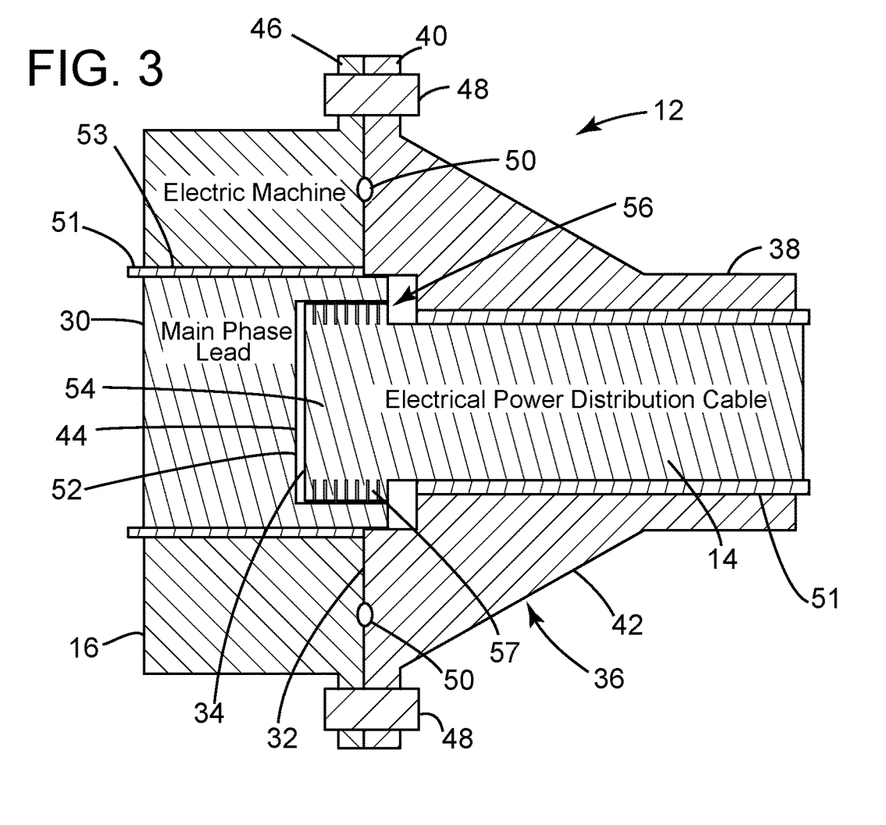
FIG. 3 shows a cross-sectional schematic of a more detailed view of a mechanical and electrical connection between an electric machine, a quick connect/disconnect connector such as a spring-based electrical connector having one or more louvered spring contacts, and an electrical power distribution cable depicted in FIG. 1 according to an embodiment of the invention.
Figure 4:
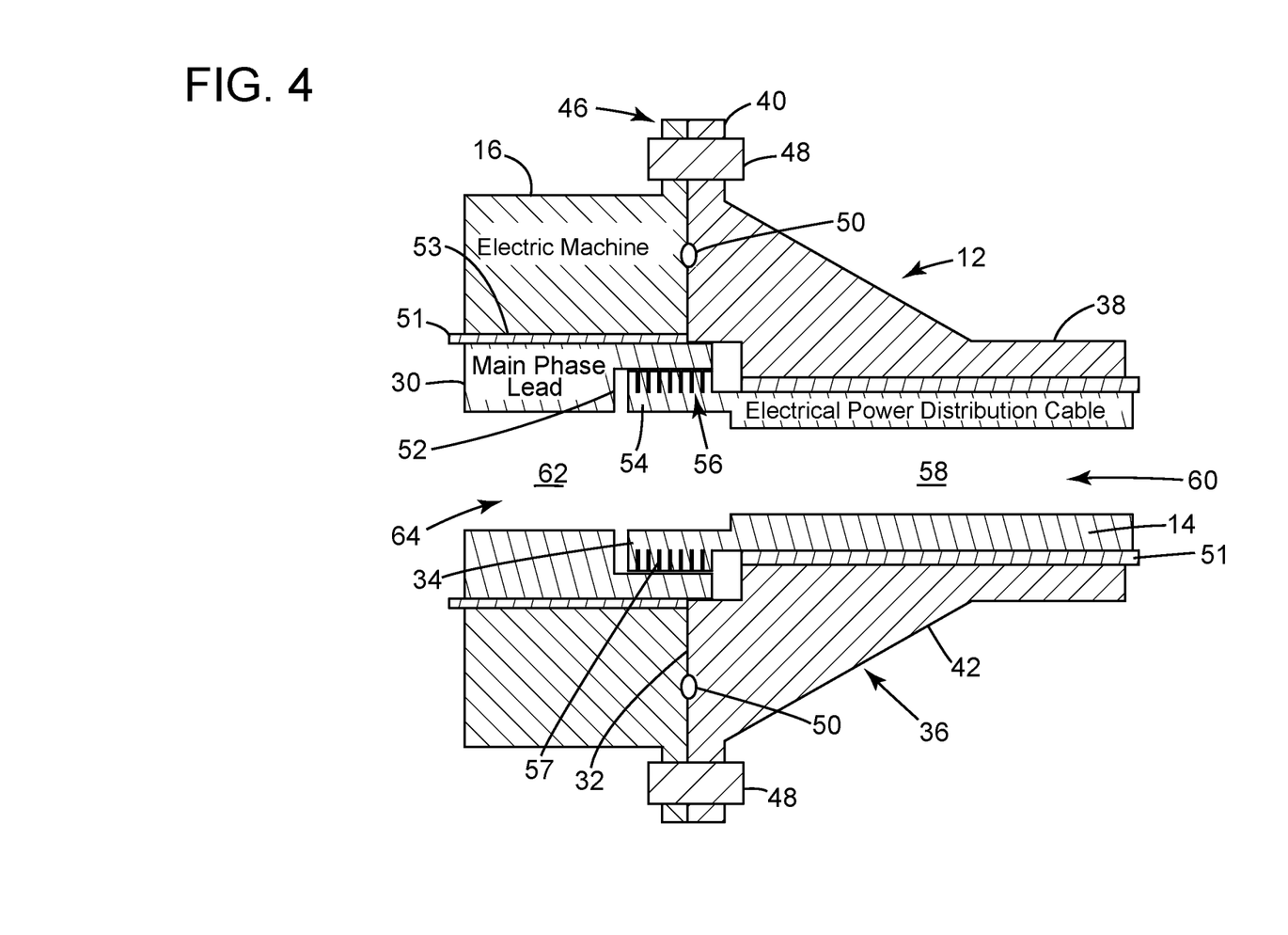
FIG. 4 shows a schematic of a more detailed view of a mechanical and electrical connection between an electric machine, a spring-based electrical connector having one or more louvered springs, and an electrical power distribution cable, in which the main phase lead of the electric machine and the electrical power distribution cable have hollow coolant passages formed therein for purposes of direct cooling the machine, the power distribution cable, and the connector according to an embodiment of the invention.
Figure 5:
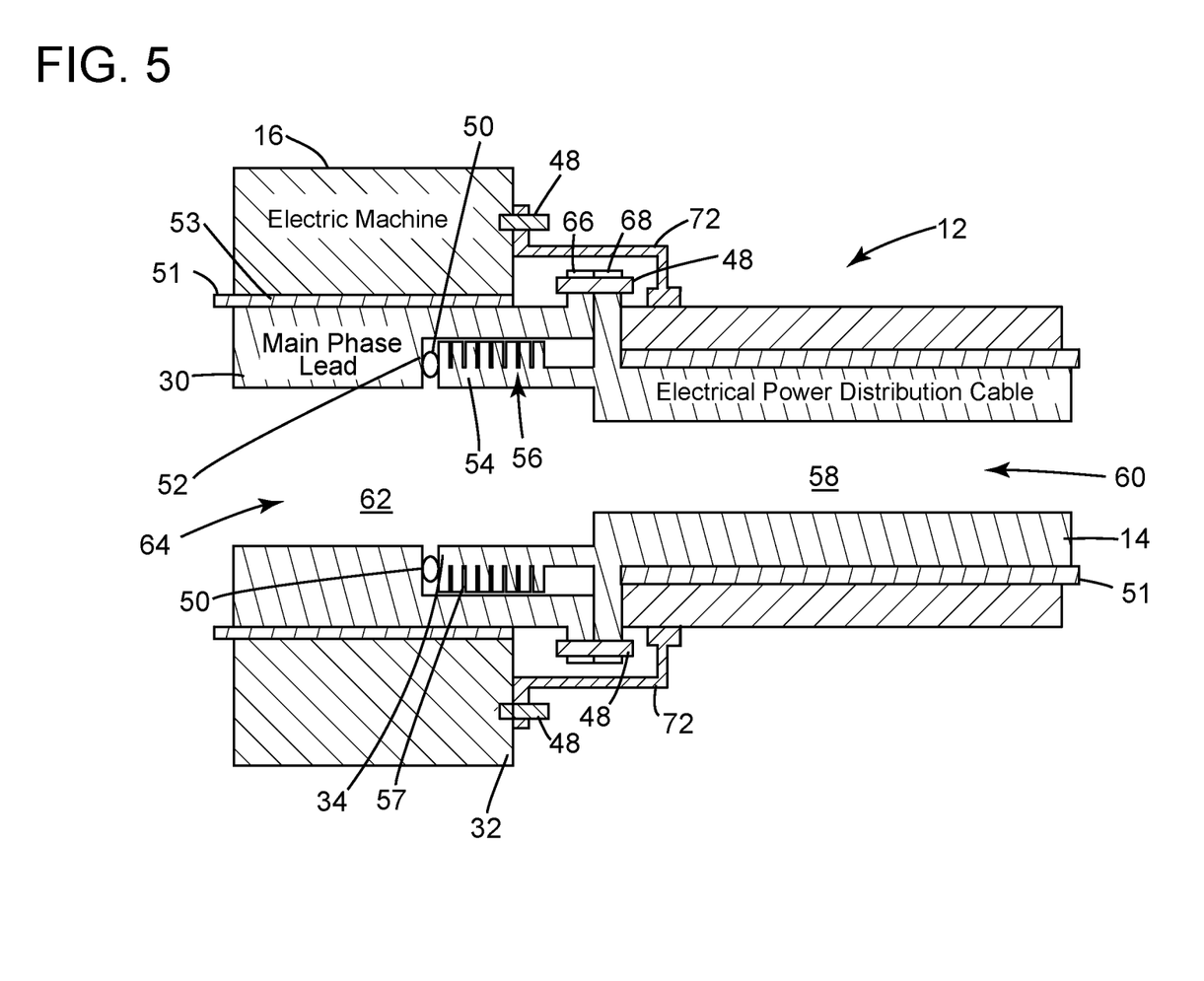
FIG. 5 shows a schematic of a more detailed view of a mechanical and electrical connection between an electric machine, a spring-based electrical connector having one or more louvered springs, and an electrical power distribution cable that is similar to FIG. 4, but with sealing elements between the electric machine and the connector to prevent leakage of coolant fluid according to an embodiment.
Figure 6:
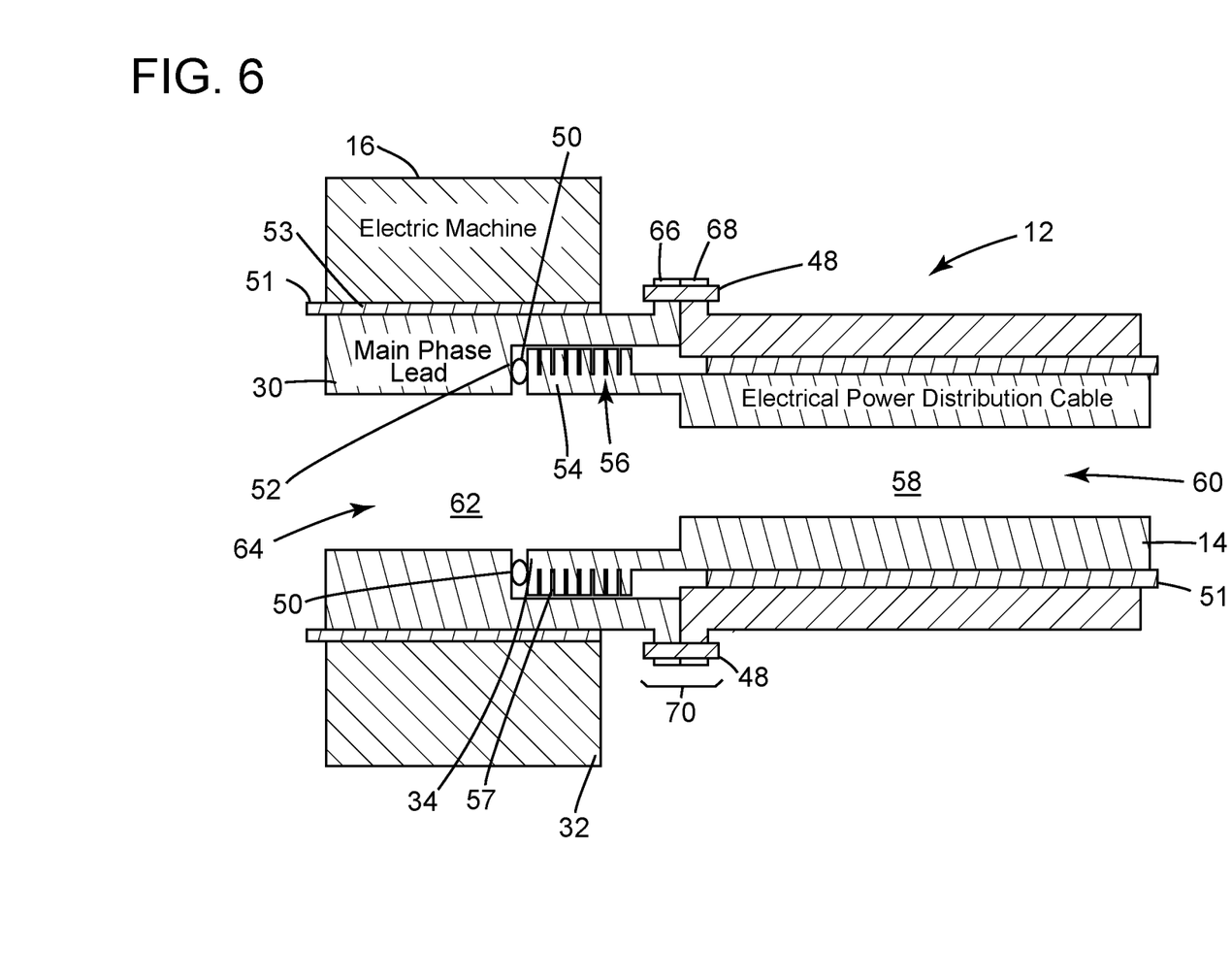
FIG. 6 shows a schematic of an approach to preventing leakage of coolant fluid according to an embodiment that is an alternative to the arrangement depicted in FIG. 5.

For clarity, FIGS. 2 and 3, as well as FIGS. 4-6 only show one conductor that is representative of the main lead in the electric machine that is in electrical connection with the connector 12 and the electrical power distribution cable 14. It is understood that the electric machine 16 and the electrical power distribution cable 14 would have separate conductors for each lead associated with these elements. Accordingly, the connector 12 would have separate quick connect/disconnect electrical connectors for connecting each of the leads in the electric machine 16 and the electrical power distribution cable 14.

Referring to FIGS. 2 and 3, further details of the connector 12 are explained in relation to a main phase lead 30 emanating from a lead end 32 of the electric machine 16. As shown in FIGS. 2 and 3, the connector 12 can be placed at one end 34 of the electrical power distribution cable 14 which opposes another end of the cable that is not shown in the figures and that can connect with another electric machine 16 or electrical component 18 via a connector 12. The connector 12 can include a connector head 36 that extends over a portion of the electrical power distribution cable 14. In one embodiment, the connector head 36 can have a first end region 38, a second end region 40 that abuts the lead end of the electric machine 16, and a middle region 42 connecting the first end region with the second end region. The first end region 38 can have a constant width, the middle region 42 can have a width that increases from the first end region to the second end region 40. As shown in FIGS. 2 and 3, the second end region 40 can have a width that is greater than the width of the first end region 38 and the middle region 42. It is understood that the tapered shape of the connector head 36 is representative of only shape and is not meant to be limiting as it is envisioned that the connector head can take the form of other shapes such as for example, circular, oval, and linear shapes.

In one embodiment, as shown in FIG. 3, an interface 44 between the second end region 40 and the lead end 32 of the electric machine 16 defines a flange 46 that facilitates the mechanical connection between the electric machine 16 and the power distribution cable 14. The flange 46 can secure the mechanical connection between the electric machine 16 and the electrical power distribution cable 14 via the at least one fastener 48. The fastener 48 can include any of a number of well-known fastener assemblies that can facilitate mechanical connections between two parts. For example, the fastener 48 can include a screw, a bolt, a pin, an insert, a rivet, a magnetic coupler and a corresponding nut, washer, ring, or the like to secure the connection. In general, the fastener 48 allows the connector 12 to be dismantled from the electric machine 16 in instances where it is desirable to have access to the machine such as during maintenance and servicing.

The flange 46 can further include at least one sealing element 50 to seal the mechanical connection between the electric machine 16 and the electrical power distribution cable 14. The sealing element 50 can include any of a number of mechanical sealing elements that can serve to prevent fluid or air from escaping between the electric machine 16 and the electrical power distribution cable 14 via the interface 44. A non-exhaustive list of mechanical sealing elements that are suitable for use in this embodiment include O-rings, a pump sealant, a flat gasket, a viscous sealant.

In addition to the fastener 48 and the sealing element 50, the connector 12 can include other elements. For example, the connector 12 can have insulation 51 to facilitate the electrical connection between the electric machine 16 and the electrical power distribution cable 14. As shown in FIG. 3, the insulation 51 can be located between the electrical power distribution cable 14 and the connector head 36 of the connector 12. In addition, the insulation can be located between the main phase lead 30 of the electric machine 16 and an inner wall 53 of the electric machine.

FIG. 3 shows that the connector 12 can further include a female part 52 such as a receptacle (e.g., a socket) that can be disposed in one of the lead end 32 of the electric machine 16 and the end 34 of the electrical power distribution cable 14. A male part 54 such as a plug can be disposed in the other of the lead end 32 of the electric machine 16 and the electrical power distribution cable 14. It is understood that the positions of the female part 52 and the male part 54 can be reversed. For example, the electrical power distribution cable 14 can configured to have the female part, while the electric machine 16 can be configured with the male part.

FIG. 3 shows that the connector 12 can further include a spring-based electrical connector 56 disposed in one of the female part 52 of the electric machine 16 and the male part 54 of the electrical power distribution cable 14. In one embodiment, the spring-based electrical connector 56 can include one more louvered spring contacts 57 to form a multi-contact spring louvered connector. To this extent, the spring-based electrical connector 56 can facilitate the electrical connection between the electric machine 16 the electrical power distribution cable 14 via the one or more louvered spring contacts 57. That is, the louvered spring contacts on the male part 54 or the female part 52 of the connector can act as both a path for electric current as well as a mechanical engagement between the male and female halves of the connector assembly. Since the one or more louvered spring contacts 57 provides an active engagement force maintaining the mechanical and electrical contact, no separate means of mechanical joining is required.

In one embodiment, the one more louvered spring contacts 57 of the spring-based electrical connector 56 can include bent sheets of metal that form spring contacts in the electrical power distribution cable 14 and the electric machine 16. As an alternative to the louvered spring contacts, the spring-based electrical connector 56 can take the form of leaf springs shaped in an arrangement.

Although FIG. 3 shows the louvered spring contacts 57 of the spring-based electrical connector 56 disposed on the electrical power distribution cable 14, it is understood that this configuration represents only one possible arrangement and is not meant to be limiting. For example, the location of the louvered spring contacts 57 of the spring-based electrical connector 56 can be reversed such that that the spring contacts are disposed in the female part 52 of the electrical machine 16. Similarly, the location of the spring-based electrical connector 56 can be altered in accordance with these options in the instance in which the electrical power distribution cable 14 is configured with the female part and the electric machine 16 is configured with the male part.

As explained above, the mechanical and electrical connection between the electric machine 16 and the electrical component 18 with the connector 12 and the electrical power distribution cable 14 can entail supplying a cooling fluid to electric machines and electrical components in an electrical system like that depicted in FIG. 1. FIG. 4 shows an example of the electric machine 16, the connector 12 and the electrical power distribution cable 14 configured to receive a cooling fluid. As shown in FIG. 4, the electrical power distribution cable 14 can include an interior cavity 58 defining a hollow coolant passage 60 formed therein. In addition, the lead end 32 of the electric machine 16 can include an interior cavity 62 defining a hollow coolant passage 64 formed therein. In one embodiment, the hollow coolant passage 64 in the lead end 32 of the electric machine 16 can be in fluid communication with the hollow coolant passage 60 of the electrical power distribution cable 14. As shown in FIG. 4, the width of the hollow coolant passage 64 in the lead end 32 of the electric machine 16 can be greater than the width of the hollow coolant passage 60 of the electrical power distribution cable 14.

It is understood that the width of the hollow coolant passage 64 in the electric machine 16 and the width of the hollow coolant passage 60 of the electrical power distribution cable 14 can vary and are not meant to limit the embodiment depicted in FIG. 4. In general, the widths of the hollow coolant passage 60 of the electrical power distribution cable 14 and the hollow coolant passage 64 in the electric machine 16 can depend on which element is configured with the female and male parts, and of which of these parts is implemented with the spring-based electrical connector 56 including the one or more louvered spring contacts 57.

In operation, a cooling device like that depicted in FIG. 1 can be configured to provide a cooling fluid to the electrical power distribution cable 14 and the electric machine 16. To this extent, the cooling fluid passing through the hollow coolant passage 60 can cool the electrical power distribution cable 14, while the cooling fluid passing through the hollow coolant passage 64 can cool the electric machine 16. In addition, the cooling fluid can cool the spring-based electrical connector 56. In one embodiment in which the electric machine 16 is a motor or a generator, the cooling fluid received from the electrical power distribution cable 14 can be used to cool the stator windings of the stator of the motor or generator.

It is understood that the hollow coolant passage 60 of the electrical power distribution cable 14 and the hollow coolant passage 64 in the electric machine 16 do not necessarily have to be in fluid communication. For example, the hollow coolant passage 60 of the electrical power distribution cable 14 can be separate from the hollow coolant passage 64 in the electric machine 16. In such an embodiment, a cooling device can be configured to supply cooling fluid separately to the electrical power distribution cable 14 and the electric machine 16.

In the embodiment depicted in FIG. 4, the louvered spring contacts 57 of the spring-based electrical connector 56 are disposed on the electrical power distribution cable 14. Similar to the embodiment described with respect to FIG. 3, the louvered spring contacts 57 of the spring-based electrical connector 56 can be configured in other positions. For example, the louvered spring contacts 57 of the spring-based electrical connector 56 can be reversed such that that the louvered spring contacts 57 are disposed in the electric machine 16.

FIGS. 5 and 6 show an alternative arrangement for providing coolant through the hollow coolant passage 60 in the electrical power distribution cable 14 and the hollow coolant passage 64 in the electric machine 16 in comparison to the embodiment depicted in FIG. 4. In particular, the embodiments depicted in FIGS. 5 and 6 are directed to preventing the leakage of a coolant fluid from the coolant passages 60 and 64 by disposing one or more sealing elements 50 between in the connector itself between the male part and female part of the connector. To this extent, the one or more sealing elements 50, which can include any of the aforementioned elements, allow the connector to prevent the coolant fluid from leaking out.

As shown in both FIGS. 5 and 6, the female part (e.g., 52) and the male part (e.g., 54) can each include a radially extending portion 66 and 68, respectively. The radially extending portions 66 and 68 define a flange 70 of which a fastener 48 like any of those described earlier can secure the radially extending portions together. The embodiment depicted in FIG. 5 adds a provision for an extra mechanical connection through the use of flange extensions 72 that secure the electric machine 16 and the electrical power distribution cable 14 at locations exterior to the coolant passages 60 and 64. Although FIGS. 5 and 6 do not show a connector head, it is understood that these embodiments can have one for purposes of providing insulation.

Figure 7A:
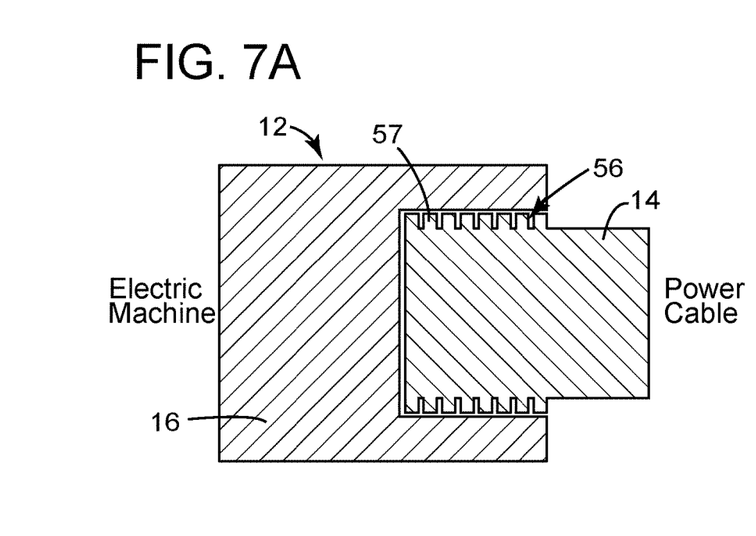
FIGS. 7A-7D show schematics of various configurations of the male and female parts of a spring-based electrical connector with one or more louvered springs with respect to the electric machine and the electrical power distribution cable according to embodiments of the invention.
Figure 7B:
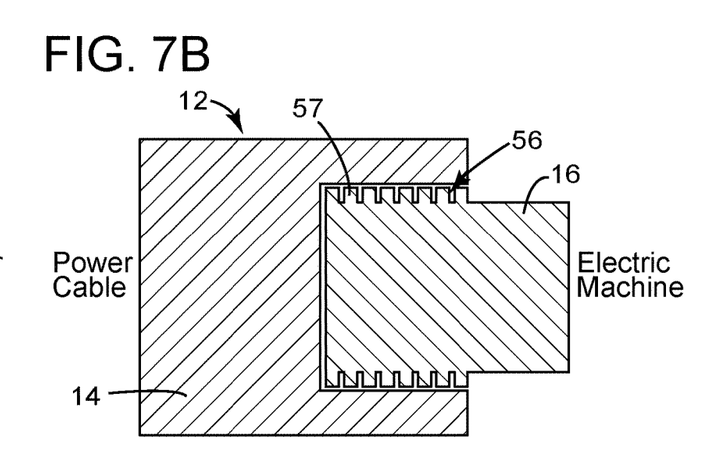
Figure 7C:
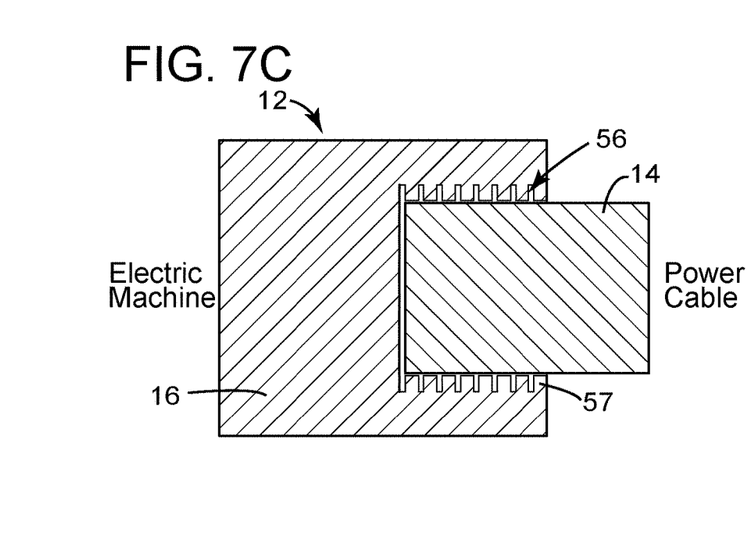
Figure 7D:
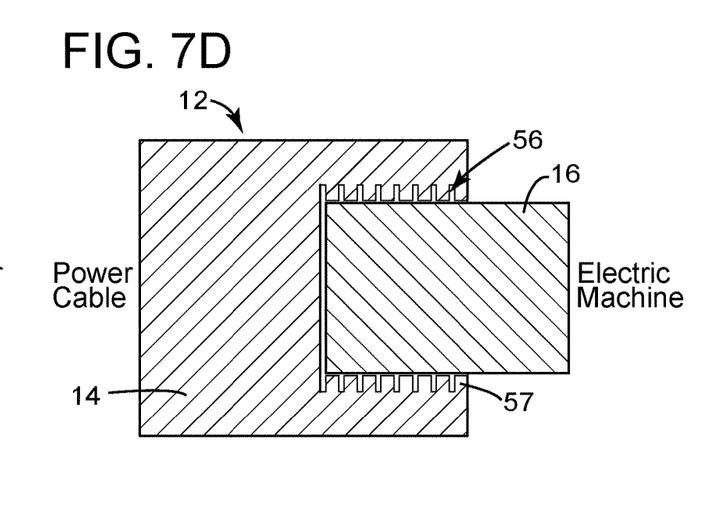

FIGS. 7A-7D show examples of the various configuration that the louvered spring contacts 57 of the spring-based electrical connector 56 can have with respect to the electric machine 16 and the electrical power distribution cable 14 that is applicable to both the embodiments depicted in FIGS. 3-6. In particular, FIG. 7A shows the electric machine 16 configured to have the female part (e.g., a receptacle, a socket, and the like) and the electrical power distribution cable 14 configured to have the male part (plug). In this embodiment, the louvered spring contacts 57 of the spring-based electrical connector 56 are disposed on the electrical power distribution cable 14 with the contacts projecting outward from the cable to the receptacle. FIG. 7B shows the electrical power distribution cable 14 configured to have the female part (e.g., a receptacle, a socket, and the like) and the electric machine 16 configured to have the male part (plug). In this embodiment, the louvered spring contacts 57 of the spring-based electrical connector 56 are disposed on the electric machine 16 with the spring contacts projecting outward from the electric machine to the receptacle in the electrical power distribution cable 14. FIG. 7C shows the electric machine 16 configured to have the female part (e.g., a receptacle, a socket, and the like) and the electrical power distribution cable 14 configured to have the male part (plug). In this embodiment, the louvered spring contacts 57 of the spring-based electrical connector 56 are disposed in the electric machine 16 with the spring contacts projecting inward to the electrical power distribution cable 14. FIG. 7D shows the electrical power distribution cable 14 configured to have the female part (e.g., a receptacle, a socket, and the like) and the electric machine 16 configured to have the male part (plug). In this embodiment, the louvered spring contacts 57 of the spring-based electrical connector 56 are disposed in the electrical power distribution cable 14 with the spring contacts projecting inward to the electric machine 16.

Although the various embodiments have been described primarily with respect to using quick connect/disconnect connectors that include spring-based electrical connectors, it is understood that other types of quick connect/disconnect connectors are suitable for use with these embodiments. For example, other quick connect/disconnect connectors that have utility with the various embodiments can include, but are not limited to, push-pull electrical connectors, and in-line voltage electrical connectors using male and female connectors, From the description of the illustrated embodiments presented herein, it should be evident that the subject disclosure sets forth an effective solution for providing connectors that can be used in electrical systems that involve electrical power generation and electrical power distribution that obviates issues associated with bus bar connectors or other commonly used connectors. This solution provided by the various embodiments includes utilizing quick connect/disconnect connectors (e.g., multi-contact spring louvered connectors) to implement mechanical and electrical connections of electric machines and ancillary electrical components in an electrical system. The use of the quick connect/disconnect connectors can reduce the number of components (and weight) in an assembly, eliminating the need for complex joining operations during manufacture or assembly (i.e., brazing). This allows for more efficient use of existing machine size envelopes due to the reduction of parts that contribute to overall machine size. Also, this eliminates the potential failure modes of typical electrical connections (e.g., braze cracking, hardware loosening, etc.).

The use of the quick connect/disconnect connectors can further act as a technology enabler in a variety of applications including low voltage, medium voltage and high voltage scenarios. In one embodiment, the quick connect/disconnect connectors can have utility with high power output and voltage machines. Examples can include, but are not limited to, both existing aircraft platforms (i.e. hybrid electric propulsion) as well as future aviation related advancements (i.e. distributed propulsion), and power generation (e.g., high voltage direct current interconnections associated with the electric grid, solar and wind turbine implementations). Furthermore, the connector style associated with the quick connect/disconnect connectors is that it can drastically simplify the ease of replacing LRUs such as on an aircraft which is both a reliability/availability/maintainability improvement as well a major product differentiator to the end user.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Moreover, articles "a" and "an" as used in the subject specification and annexed drawings should generally be construed to mean "one or more" unless specified otherwise or clear from context to be directed to a singular form.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system, comprising: a plurality of electric machines and electrical components, each electric machine and electrical component having a lead end; a plurality of electrical power distribution cables to distribute power between the plurality of electric machines and electrical components; a plurality of connectors to facilitate mechanical and electrical connections of the plurality of electric machines and electrical components with the plurality of electrical power distribution cables, each connector placed between one of the electric machines and the electrical components and a corresponding electrical power distribution cable operative to provide power thereto, wherein each connector includes: a connector head that extends over a portion of the corresponding electrical power distribution cable that facilitates the mechanical connection between the one of the electric machines and electrical components and the corresponding electrical power distribution cable; a receptacle disposed in one of the lead end of the electric machines and electrical components and the corresponding electrical power distribution cable; a plug disposed in the other of the lead end of the electric machines and the electrical components and the corresponding electrical power distribution cable; and a quick connect/disconnect electrical connector disposed in one of the receptacle and the plug, the quick connect/disconnect electrical connector facilitating the electrical connection between the one of the electric machines and the electrical components and the corresponding electric power distribution cable.

The system of the preceding clause, wherein the lead end of the one of the electric machines and the electrical components and the corresponding electrical power distribution cable include an interior cavity defining a hollow coolant passage formed therein, the hollow coolant passage in the lead end of the one of the electric machines and electrical components is in fluid communication with the hollow coolant passage of the corresponding electrical power distribution cable.

The system of any of the preceding clauses, further comprising a cooling device having cooling fluid operatively coupled to the plurality of electric machines and electrical components, and the plurality of electrical power distribution cables, wherein the cooling device is configured to supply the cooling fluid to the plurality of electric machines and electrical components via the plurality of electrical power distribution cables.

The system of any of the preceding clauses, wherein each connector further comprises at least one sealing element disposed between an interface of the receptacle and the plug.

The system of any of the preceding clauses, wherein each of the receptacle and the plug comprises at least one radially extending portion, the at least one radially extending portion of the receptacle and the plug defining at least one flange portion that facilitates a mechanical connection between the lead end of the one of the electric machines and electrical components and the corresponding electrical power distribution cable.

The system of any of the preceding clauses, further comprising at least one fastener to secure the mechanical connection between the lead end of the one of the electric machines and electrical components and the corresponding electrical power distribution cable via the at least one flange.

The system of any of the preceding clauses, wherein each connector further comprises at least one flange extension disposed between the one of the electric machines and electrical components and the corresponding electrical power distribution cable, the at least one flange extension enclosing the at least one flange portion.

The system of any of the preceding clauses, further comprising at least one fastener to secure the mechanical connection between the one of the electric machines and electrical components and the corresponding electrical power distribution cable via the at least one flange extension.

The system of any of the preceding clauses, wherein the connector head comprises an interface region between the lead end of one of the electric machines and electrical components that defines a flange that facilitates the mechanical connection.

The system of any of the preceding clauses, further comprising at least one fastener to secure the mechanical connection between the one of the electric machines and electrical components and the corresponding electrical power distribution cable via the flange.

The system of any of the preceding clauses, further comprising at least one sealing element disposed in the flange to seal the mechanical connection between the one of the electric machines and the electrical components and the corresponding electrical power distribution cable via the flange.

The system of any of the preceding clauses, wherein the quick connect/disconnect electrical connector comprises a spring-based electrical connector with one or more louvered spring contacts.

The system of any of the preceding clauses, wherein the receptacle is disposed in the lead end of one of the electric machines and the electrical components, the plug is disposed on the corresponding electrical power distribution cable, and the spring-based electrical connector with one or more louvered spring contacts is disposed on the plug with the one or more louvered spring contacts projecting outward from the corresponding electrical power distribution cable towards the receptacle.

The system of any of the preceding clauses, wherein the receptacle is disposed in the lead end of the one of the electric machines and the electrical components, the plug is disposed in the corresponding electrical power distribution cable, and the spring-based electrical connector with one or more louvered spring contacts is disposed in the receptacle with the one or more louvered spring contacts projecting inward towards the corresponding electrical power distribution cable.

The system of any of the preceding clauses, wherein the receptacle is disposed in the corresponding electrical power distribution cable, the plug is disposed on the lead end of the one of the electric machines and the electrical components, and the spring-based electrical connector with one or more louvered spring contacts is disposed on the plug with the one or more louvered spring contacts projecting outward towards the receptacle in the corresponding electrical power distribution cable.

The system of any of the preceding clauses, wherein the receptacle is disposed in the corresponding electrical power distribution cable, the plug is disposed on the lead end of the one of the electric machines and the electrical components, and the spring-based electrical connector with one or more louvered spring contacts is disposed on the receptacle with the spring contacts projecting inward towards the plug disposed on the lead end of the one of the electric machines and the electrical components.

A system, comprising: a plurality of electric machines and electrical components, each electric machine and electrical component having a lead end with a main phase lead thereat, the main phase lead having an interior cavity defining a hollow coolant passage formed therethrough; a plurality of electrical power distribution cables to distribute power between the plurality of electric machines and electrical components, each electrical power distribution cable including a hollow coolant passage therethrough; a plurality of connectors to facilitate mechanical and electrical connections between the plurality of electric machines and the electrical components with the plurality of electrical power distribution cables, each connector placed between one of the electric machines and the electrical components and a corresponding electrical power distribution cable operative to provide power thereto, wherein each connector includes: a connector head that extends over a portion of a corresponding electrical power distribution cable that facilitates the mechanical connection between the one of the electric machines and the electrical components and the corresponding electrical power distribution cable; a receptacle disposed in one of the main phase lead of the electric machines and the electrical components and the corresponding electrical power distribution cable; a plug disposed in the other of the main phase lead of the electric machines and the electrical components and the corresponding electrical power distribution cable; and a spring-based electrical connector disposed in one of the receptacle and the plug, the spring-based electrical connector facilitating the electrical connection between the one of the electric machines and the electrical components and the corresponding electrical power distribution cable, wherein the spring-based electrical connector includes protruding spring contacts; and a cooling device having cooling fluid operatively coupled to the plurality of electric machines and electrical components and the plurality of electrical power distribution cables, wherein the cooling device is configured to supply cooling fluid to the plurality of electric machines and electrical components via the hollow coolant passage in each of the electric machines and the electrical components and the plurality of electrical power distribution cables via the hollow coolant passage in each of the electrical power distribution cables.

The system of the preceding clause, wherein the hollow coolant passage in each electrical power distribution cable is in fluid communication with the hollow coolant passage of an adjacent electric machine or electrical component.

The system of any of the preceding clauses, wherein the plurality of electric machines comprise one or more of an electric generator having a stator with stator windings and an electric motor having a stator with stator windings.

The system of any of the preceding clauses, wherein the cooling device is configured to direct cool the stator windings in each of the plurality of electric machines via the hollow coolant passage in the main phase leads of the electric machines and the hollow coolant passage of corresponding electrical power distribution cables adjacent the electric machines.

What is claimed is:
1. A system, comprising:
a plurality of electric machines and electrical components, each electric machine and electrical component having a lead end;
a plurality of electrical power distribution cables to distribute power between the plurality of electric machines and electrical components;
a plurality of connectors to facilitate mechanical and electrical connections of the plurality of electric machines and electrical components with the plurality of electrical power distribution cables, each connector placed between one of the electric machines and the electrical components and a corresponding electrical power distribution cable operative to provide power thereto, wherein each connector includes:
a connector head that extends over a portion of the corresponding electrical power distribution cable that facilitates the mechanical connection between the one of the electric machines and electrical components with the corresponding electrical power distribution cable, wherein a part of the connector head physically contacts the one of the electric machines and electrical components;
a receptacle disposed in one of the lead end of the electric machines and electrical components and the corresponding electrical power distribution cable;
a plug disposed in the other of the lead end of the electric machines and the electrical components and the corresponding electrical power distribution cable; and
a quick connect/disconnect electrical connector disposed in one of the receptacle and the plug, the quick connect/disconnect electrical connector facilitating the electrical connection between the one of the electric machines and the electrical components with the corresponding electric power distribution cable.

2. The system of claim 1, wherein the lead end of the one of the electric machines and the electrical components and the corresponding electrical power distribution cable include an interior cavity defining a hollow coolant passage formed therein, the hollow coolant passage in the lead end of the one of the electric machines and electrical components is in fluid communication with the hollow coolant passage of the corresponding electrical power distribution cable.

3. The system of claim 2, further comprising a cooling device having cooling fluid operatively coupled to the plurality of electric machines and electrical components, and the plurality of electrical power distribution cables, wherein the cooling device is configured to supply the cooling fluid to the plurality of electric machines and electrical components via the plurality of electrical power distribution cables.

4. The system of claim 2, wherein each connector further comprises at least one sealing element disposed between an interface of the receptacle and the plug.

5. The system of claim 4, wherein each of the receptacle and the plug comprises at least one radially extending portion, the at least one radially extending portion of the receptacle and the plug defining at least one flange portion that facilitates a mechanical connection between the lead end of the one of the electric machines and electrical components with the corresponding electrical power distribution cable.

6. The system of claim 5, further comprising at least one fastener to secure the mechanical connection between the lead end of the one of the electric machines and electrical components with the corresponding electrical power distribution cable via the at least one flange.

7. The system of claim 5, wherein each connector further comprises at least one flange extension disposed between the one of the electric machines and electrical components and the corresponding electrical power distribution cable, the at least one flange extension enclosing the at least one flange portion and making physical and direct contact with the one of the electric machines and electrical components and the corresponding electrical power distribution cable.

8. The system of claim 7, further comprising at least one fastener to secure the mechanical connection between the one of the electric machines and electrical components with the corresponding electrical power distribution cable via the at least one flange extension.

9. The system of claim 1, wherein the connector head comprises an interface region between the lead end of one of the electric machines and electrical components that defines a flange that facilitates the mechanical connection.

10. The system of claim 9, further comprising at least one fastener to secure the mechanical connection between the one of the electric machines and electrical components with the corresponding electrical power distribution cable via the flange.

11. The system of claim 9, further comprising at least one sealing element disposed in the flange to seal the mechanical connection between the one of the electric machines and the electrical components with the corresponding electrical power distribution cable via the flange.

12. The system of claim 1, wherein the quick connect/disconnect electrical connector comprises a spring-based electrical connector with one or more louvered spring contacts.

13. The system of claim 12, wherein the receptacle is disposed in the lead end of one of the electric machines and the electrical components, the plug is disposed on the corresponding electrical power distribution cable, and the spring-based electrical connector with one or more louvered spring contacts is disposed on the plug with the one or more louvered spring contacts projecting outward from the corresponding electrical power distribution cable towards the receptacle.

14. The system of claim 12, wherein the receptacle is disposed in the lead end of the one of the electric machines and the electrical components, the plug is disposed in the corresponding electrical power distribution cable, and the spring-based electrical connector with one or more louvered spring contacts is disposed in the receptacle in the lead end of the one of the electric machines and the electrical components with the one or more louvered spring contacts projecting inward towards the corresponding electrical power distribution cable.

15. The system of claim 12, wherein the receptacle is disposed in the corresponding electrical power distribution cable, the plug is disposed on the lead end of the one of the electric machines and the electrical components, and the spring-based electrical connector with one or more louvered spring contacts is disposed on the plug on the lead end of the one of the electric machines and the electrical components with the one or more louvered spring contacts projecting outward towards the receptacle in the corresponding electrical power distribution cable.

16. The system of claim 12, wherein the receptacle is disposed in the corresponding electrical power distribution cable, the plug is disposed on the lead end of the one of the electric machines and the electrical components, and the spring-based electrical connector with one or more louvered spring contacts is disposed on the receptacle with the spring contacts projecting inward towards the plug disposed on the lead end of the one of the electric machines and the electrical components.

17. A system, comprising:
a plurality of electric machines and electrical components, each electric machine and electrical component having a lead end with a main phase lead thereat, the main phase lead having an interior cavity defining a hollow coolant passage formed therethrough;
a plurality of electrical power distribution cables to distribute power between the plurality of electric machines and electrical components, each electrical power distribution cable including a hollow coolant passage therethrough;
a plurality of connectors to facilitate mechanical and electrical connections between the plurality of electric machines and the electrical components with the plurality of electrical power distribution cables, each connector placed between one of the electric machines and the electrical components and a corresponding electrical power distribution cable operative to provide power thereto, wherein each connector includes:
 a connector head that extends over a portion of a corresponding electrical power distribution cable that facilitates the mechanical connection between the one of the electric machines and the electrical components with the corresponding electrical power distribution cable;
 a receptacle disposed in one of the main phase lead of the electric machines and the electrical components and the corresponding electrical power distribution cable;
 a plug disposed in the other of the main phase lead of the electric machines and the electrical components and the corresponding electrical power distribution cable; and
 a spring-based electrical connector disposed in one of the receptacle and the plug, the spring-based electrical connector facilitating the electrical connection between the one of the electric machines and the electrical components with the corresponding electrical power distribution cable, wherein the spring-based electrical connector includes protruding spring contacts that provide a direct and physical contact between the one of the electric machines or the electrical components with the corresponding electrical power distribution cable; and
a cooling device having cooling fluid operatively coupled to the plurality of electric machines and electrical components and the plurality of electrical power distribution cables, wherein the cooling device is configured to supply cooling fluid to the plurality of electric machines and electrical components via the hollow coolant passage in each of the electric machines and the electrical components and the plurality of electrical power distribution cables via the hollow coolant passage in each of the electrical power distribution cables.

18. The system of claim 17, wherein the hollow coolant passage in each electrical power distribution cable is in fluid communication with the hollow coolant passage of an adjacent electric machine or electrical component.

19. The system of claim 17, wherein the plurality of electric machines comprise one or more of an electric generator having a stator with stator windings and an electric motor having a stator with stator windings.

20. The system of claim 19, wherein the cooling device is configured to direct cool the stator windings in each of the plurality of electric machines via the hollow coolant passage in the main phase leads of the electric machines and the hollow coolant passage of corresponding electrical power distribution cables adjacent the electric machines.

\* \* \* \* \*